US012576441B2

(12) United States Patent
Yakabe et al.

(10) Patent No.: US 12,576,441 B2
(45) Date of Patent: Mar. 17, 2026

(54) PIPE EXPANDING TOOL

(71) Applicant: MAKITA CORPORATION, Anjo (JP)

(72) Inventors: Koichi Yakabe, Anjo (JP); Hiroki Ikuta, Anjo (JP)

(73) Assignee: MAKITA CORPORATION, Anjo (JP)

( * ) Notice: Subject to any disclaimer, the term of this patent is extended or adjusted under 35 U.S.C. 154(b) by 579 days.

(21) Appl. No.: 17/961,138

(22) Filed: Oct. 6, 2022

(65) Prior Publication Data

US 2023/0141074 A1 May 11, 2023

(30) Foreign Application Priority Data

Nov. 5, 2021 (JP) ................................. 2021-181036

(51) Int. Cl.
*B21D 39/20* (2006.01)
*B21D 41/02* (2006.01)
*B29C 57/04* (2006.01)

(52) U.S. Cl.
CPC ........... *B21D 39/20* (2013.01); *B21D 41/026* (2013.01); *B29C 57/04* (2013.01)

(58) Field of Classification Search
None
See application file for complete search history.

(56) References Cited

U.S. PATENT DOCUMENTS

| | | | |
|---|---|---|---|
| 7,922,475 B2 | 4/2011 | Gueit | |
| 2010/0308503 A1 | 12/2010 | Schramm et al. | |
| 2015/0258598 A1* | 9/2015 | Frenken | F15B 15/063 |
| | | | 72/370.08 |
| 2020/0261959 A1* | 8/2020 | Wekwert | B29C 57/06 |

OTHER PUBLICATIONS

Mar. 1, 11, 2025 Office Action issued in Japanese Patent Application No. 2021-181036.

* cited by examiner

*Primary Examiner* — Jacob T Minskey
*Assistant Examiner* — Adrien J Bernard
(74) *Attorney, Agent, or Firm* — OLIFF PLC

(57) ABSTRACT

A pipe expanding tool includes a wedge, a plurality of jaws, a spring and a first rotary member. The wedge is movable in a reciprocating manner between a first position and a second position along a first axis. The jaws are rotatable around the first axis and movable to a closed position and to an open position. The jaws are configured to move from the closed position to the open position as the wedge moves from the first position to the second position, and to move from the open position to the closed position as the wedge moves from the second position to the first position. The first rotary member is engaged with the jaws such that the first rotary member is integrally rotatable with the jaws, and is configured to be rotated only in one direction around the first axis by an elastic force of the spring.

14 Claims, 10 Drawing Sheets

UP

REAR ←→ FRONT

DOWN

PIPE EXPANDING TOOL

CROSS-REFERENCE TO RELATED APPLICATION

The present application claims priority to Japanese patent application No. 2021-181036 filed on Nov. 5, 2021, the contents of which are hereby fully incorporated herein by reference.

TECHNICAL FIELD

The present disclosure relates to a pipe expanding tool that is configured to expand an end of a pipe.

BACKGROUND

A pipe expanding tool is configured to expand an end of a pipe made of plastic (polymeric) material, such as PEX (cross-linked polyethylene) so as to allow connection of pipes. The pipe expanding tool has a conical (tapered) wedge (also referred to as a needle) that reciprocates in an axial direction, and a plurality of jaws (also referred to as chucks) that are configured to expand the end of the pipe by moving radially outward along with forward movement of the wedge. Further, a pipe expanding tool is also known that includes a rotating mechanism for the jaws, in order to change positions of the jaws in the circumferential direction (see, e.g. U.S. Pat. No. 7,922,475). This rotating mechanism has a cam that moves integrally with a needle in an axial direction, and a crown that is operably coupled to the cam via a follower. The crown is rotated integrally with the jaws around an axis while the cam moves in the axial direction.

SUMMARY

The above-described rotating mechanism for the jaws is forced to rotate the jaws even if the jaws cannot be rotated for some reason. Therefore, excessive load may be applied to the rotating mechanism, so that the rotating mechanism may break.

It is accordingly a non-limiting object of the present disclosure to provide an improvement of a rotating mechanism for jaws in a pipe expanding tool for expanding an end of a pipe.

In one non-limiting aspect according to the present disclosure, a pipe expanding tool includes a wedge, a plurality of jaws, a spring and a first rotary member. The wedge is movable in a reciprocating manner between a first position and a second position along a first axis. The jaws are rotatable around the first axis and are movable relative to the first axis to a closed position and to an open position that is defined (located) radially outward of the closed position. The jaws are configured to move from the closed position to the open position as the wedge moves from the first position to the second position. The jaws are also configured to move from the open position to the closed position as the wedge moves from the second position to the first position. The first rotary member is engaged with the jaws such that the first rotary member is integrally rotatable with the jaws. The first rotary member is configured to be rotated only in one direction around the first axis by an elastic force (elastic energy, a restoring force) of the spring.

In the pipe expanding tool according to this aspect, the first rotary member is rotated by the elastic force of the spring to thereby rotate the jaws. Therefore, even if the first rotary member is forced to rotate the jaws while the jaws cannot be rotated for some reason, any force that exceeds the elastic force of the spring is not applied to the first rotary member. Therefore, possibility of damage to the first rotary member due to excessive load thereon can be effectively reduced.

DETAILED DESCRIPTION OF THE EMBODIMENT

Figure 1:
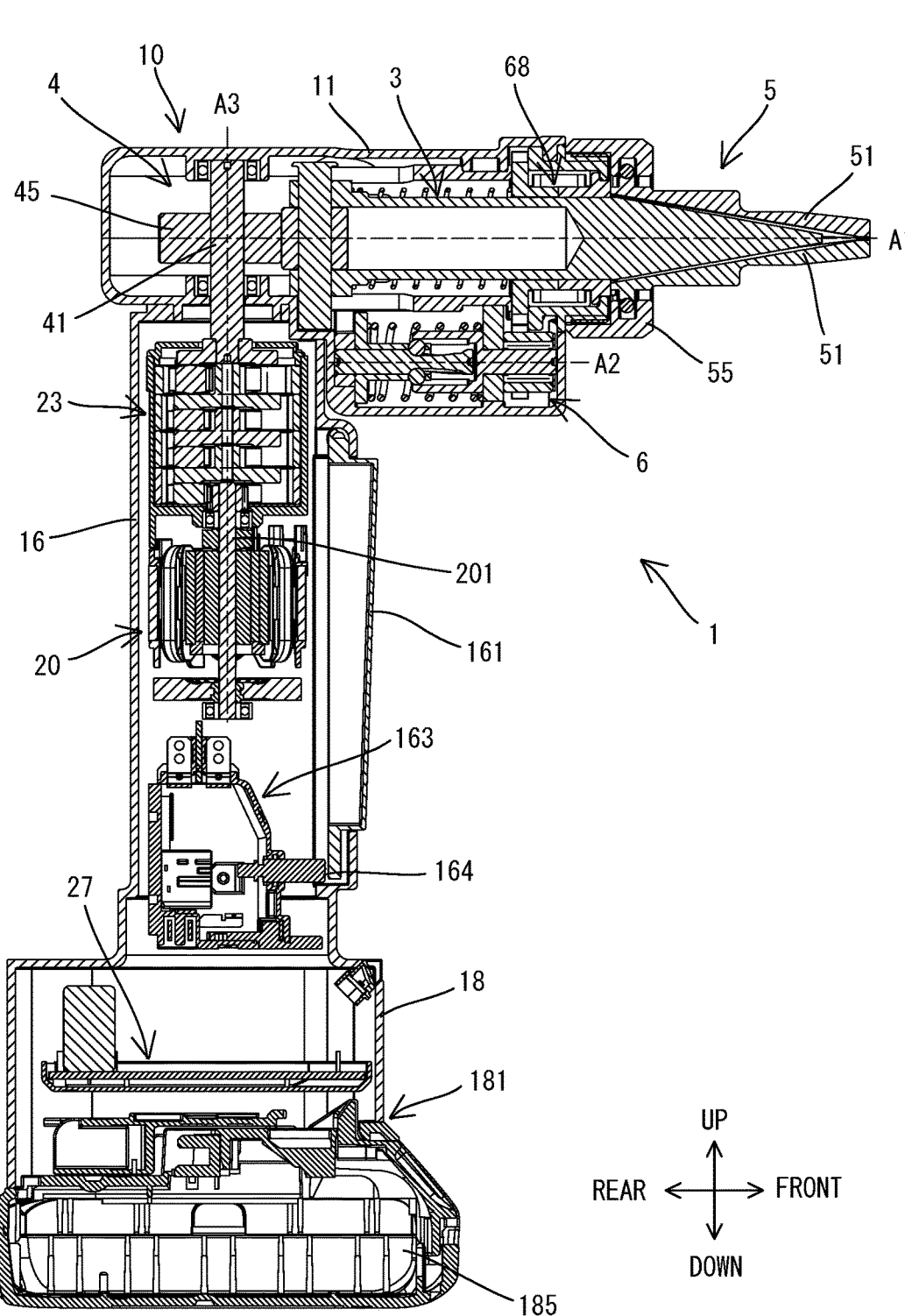
FIG. 1 is a sectional view of a pipe expanding tool according to an embodiment of this disclosure, showing a state in which a wedge is in a first position and jaws are in a closed position.

In one non-limiting embodiment according to the present disclosure, the first rotary member may be configured to be rotated by the elastic force of the spring, corresponding to at least a portion of a first movement phase of the wedge in which the wedge moves from the second position to the first position. According to this embodiment, after expanding an end of a pipe, the jaws rotate while returning from the open position to the closed position (i.e., while moving away from an inner peripheral surface of the expanded end of the pipe). Thus, the possibility that the jaws are affected by the inner peripheral surface of the pipe can be reduced, so that the first rotary member can smoothly rotate the jaws.

In addition or in the alternative to the preceding embodiment, the spring may be configured to store (accumulate) the elastic force, corresponding to at least a portion of a second movement phase of the wedge in which the wedge moves from the first position to the second position. The first rotary member may be configured to be rotated by the elastic force stored (accumulated) in the spring, corresponding to at least a portion of the first movement phase of the wedge. According to this embodiment, a phase in which the spring stores the elastic force (elastic energy, restoring force) and a phase in which the first rotary member rotates the jaws using the elastic force stored in the spring can rationally correspond to the two movement phases (the second and first movement phases) of the wedge, respectively.

In addition or in the alternative to the preceding embodiments, the pipe expanding tool may further include a movable member that is operably coupled to the spring and that is configured to move to thereby elastically deform the spring, corresponding to at least a portion of the second movement phase of the wedge. According to this embodiment, the movable member can efficiently cause the spring to store the elastic force.

In addition or in the alternative to the preceding embodiments, the pipe expanding tool may further include a second rotary member and a transmitting member. The second rotary member may be configured to be rotated in a first direction around a second axis, corresponding to at least a portion of the second movement phase of the wedge Further, the second rotary member may also be configured to be rotated in a second direction, which is opposite to the first direction around the second axis, by the elastic force of the spring, corresponding to at least a portion of the first movement phase of the wedge. The transmitting member may be operably coupled to the first rotary member and the second rotary member. The transmitting member may be configured to transmit only rotation of the second rotary member in the second direction to the first rotary member. This embodiment achieves a rational structure for rotating the jaws only while the second rotary member is rotated in the second direction by the elastic force of the spring, by utilizing the second rotary member that is rotatable in the two opposite directions (i.e., the first and second directions) around the second axis.

In addition or in the alternative to the preceding embodiments, the pipe expanding tool may further include a motion converting mechanism that is operably coupled to the spring and to the first rotary member. The motion converting mechanism may be configured to convert linear motion into rotation (rotary motion). The motion converting mechanism may be at least configured to be actuated by the elastic force of the spring to rotate the first rotary member, corresponding to at least a portion of the movement phase of the wedge from the second position to the first position. According to this embodiment, the first rotary member and the jaws can be efficiently rotated by utilizing the elastic force of the spring to convert linear motion into rotation.

In addition or in the alternative to the preceding embodiments, the motion converting mechanism may include a fixed member and a second rotary member that is operably engaged with the fixed member via a cam part. At least a portion of the second rotary member may be configured to cause the first rotary member to rotate by rotating around the second axis while moving along the second axis relative to the fixed member. According to this embodiment, a rational mechanism for converting linear motion into rotation can be achieved.

In addition or in the alternative to the preceding embodiments, the spring may be a coil spring. The fixed member and the second rotary member may be at least partially disposed inside the coil spring. According to this embodiment, the spring and the motion converting mechanism can be disposed within a relatively small space.

In addition or in the alternative to the preceding embodiments, the second rotary member may include a first part and a second part that are connected to each other. The first and second parts may be integrally rotatable around the second axis and movable relative to each other along the second axis. According to this embodiment, both the first and second parts can be integrally rotated by simply moving only one of the first and second parts along the second axis.

In addition or in the alternative to the preceding embodiments, the first part may be movable along the second axis relative to the fixed member and the second part. Further, the first part may be configured to elastically deform the spring by moving along the second axis, corresponding to at least a portion of the second movement phase of the wedge. According to this embodiment, the elastic force can be efficiently stored in the spring along with movement of the first part.

A pipe expanding tool 1 according to a non-limiting embodiment of the present disclosure is now described with reference to the drawings. The pipe expanding tool 1 is a power tool that is used to expand an end of a pipe or a tube (e.g., a pipe made of cross-linked polyethylene (PEX)) so as to allow connection of the pipe to another pipe. The pipe expanding tool 1 may also be called a PEX expansion tool.

First, the general structure of the pipe expanding tool 1 is described.

As shown in FIG. 1, the pipe expanding tool 1 mainly includes an L-shaped housing 10, a jaw assembly 5 that is disposed on one end portion of the housing 10, a motor 20 that is disposed within the housing 10, and a wedge 3 that is disposed within the housing 10 and that is configured to be moved in a reciprocating manner (reciprocated) by the motor 20.

The wedge 3 extends along a driving axis A1 within the housing 10. A front (distal) end portion of the wedge 3 protrudes into the jaw assembly 5 via an opening formed in the housing 10. The jaw assembly 5 includes a plurality of jaws 51 that are disposed around the wedge 3 to be movable in a radial direction relative to the driving axis A1. An elongate portion of the housing 10 that extends substantially orthogonally to the driving axis A1 includes a grip part 16 that is configured to be held by a user. A lever (also referred to as a trigger) 161 is supported by the grip part 16 and configured to be manually depressed by a user. When the motor 20 is driven in response to depressing operation of the lever 161 performed by the user, the wedge 3 is reciprocated and the jaws 51 are moved in the radial direction. An end of a pipe is expanded by radially outward movement of the jaws 51.

In the following description, for the sake of convenience, the extending direction of the driving axis A1 is defined as a front-rear direction of the pipe expanding tool 1. In the front-rear direction, the side of the front end of the wedge 3 is defined as the front side and the opposite side is defined as the rear side of the pipe expanding tool 1. A direction that is orthogonal to the driving axis A1 and that corresponds to a longitudinal direction of the grip part 16 is defined as an up-down direction of the pipe expanding tool 1. In the up-down direction, the side of a distal end (free end) of the grip part 16 is defined as a lower side, and the opposite side is defined as an upper side of the pipe expanding tool 1. A direction that is orthogonal to the front-rear direction and the up-down direction is defined as a left-right direction of the pipe expanding tool 1.

The detailed structure of the pipe expanding tool 1 is now described.

As shown in FIG. 1, the housing 10 includes a body part 11 extending in the front-rear direction along the driving axis A1, the grip part 16 protruding downward from a rear end portion of the body part 11, and a controller housing part 18 connected to a lower end of the grip part 16.

The jaw assembly 5 is removably coupled to a front end of the body part 11. The body part 11 houses the wedge 3, a reciprocating mechanism 4 for the wedge 3, and a rotating mechanism 6 for the jaws 51. The detailed structures of the mechanisms (components, elements) disposed within the body part 11 and the jaw assembly 5 will be described below.

The grip part 16 houses the motor 20, a speed reducer 23 and a switch 163.

The motor 20 is within a central portion of the grip part 16 in the up-down direction. In this embodiment, a brushless DC motor is employed as the motor 20. An output shaft 201 of the motor 20 extends in the up-down direction. The output shaft 201 is rotatably supported at its upper and lower ends by bearings that are supported within the housing 10. A rotational axis of the output shaft 201 extends orthogonally to the driving axis A1.

The speed reducer 23 is disposed above the motor 20 within the grip part 16. The speed reducer 23 is operably coupled to the output shaft 201 of the motor 20. In this embodiment, a multi-stage planetary gear reducer is employed as the speed reducer 23. The output shaft 201 of the motor 20 functions as an input shaft of the speed reducer 23. A driving shaft 41 is coupled to an output shaft of the speed reducer 23. An axis A3 of the driving shaft 41 extends in the up-down direction and orthogonally to the driving axis A1. The driving shaft 41 is rotationally driven around the axis A3 at a lower speed than the output shaft 201 of the motor 20 when the motor 20 is driven. A speed reducer that includes a normal gear train may be employed as the speed reducer 23, in place of the planetary gear reducer.

The switch 163 is disposed within a lower end portion of the grip part 16. A plunger 164 of the switch 163 is directly behind the lever 161 (more specifically, directly behind a lower end portion of the lever 161) that is on the front side of the grip part 16. The switch 163 is kept OFF while the lever 161 is not depressed. When the lever 161 is depressed rearward, the plunger 164 is pushed rearward by the lever 161 and turns ON the switch 163. The switch 163 is electrically connected to the controller 27 (described below) via electric wires (not shown), and configured to output a prescribed signal to the controller 27 while the switch 163 is ON.

The controller 27 is disposed within the controller housing part 18. The controller 27 is configured to control operation of the pipe expanding tool 1. The controller 27 is configured, for example, as a microcomputer that includes a CPU, a ROM and a RAM. Alternatively, the controller 27 may be other kind of circuit. The controller 27 is configured to drive the motor 20 while the switch 163 is ON. Further, a battery mounting part 181 is provided in a lower end portion of the controller housing part 18. The battery mounting part 181 is configured to removably receive a rechargeable battery (also referred to as a battery pack or a battery cartridge) 185. Although not shown and described in detail, the battery mounting part 181 has an engagement structure that is configured to slidingly engage with the battery 185, and terminals that are electrically connectable to terminals of the battery 185.

The structures of the wedge 3 and the reciprocating mechanism 4 for the wedge 3 are now described in detail.

Figure 2:
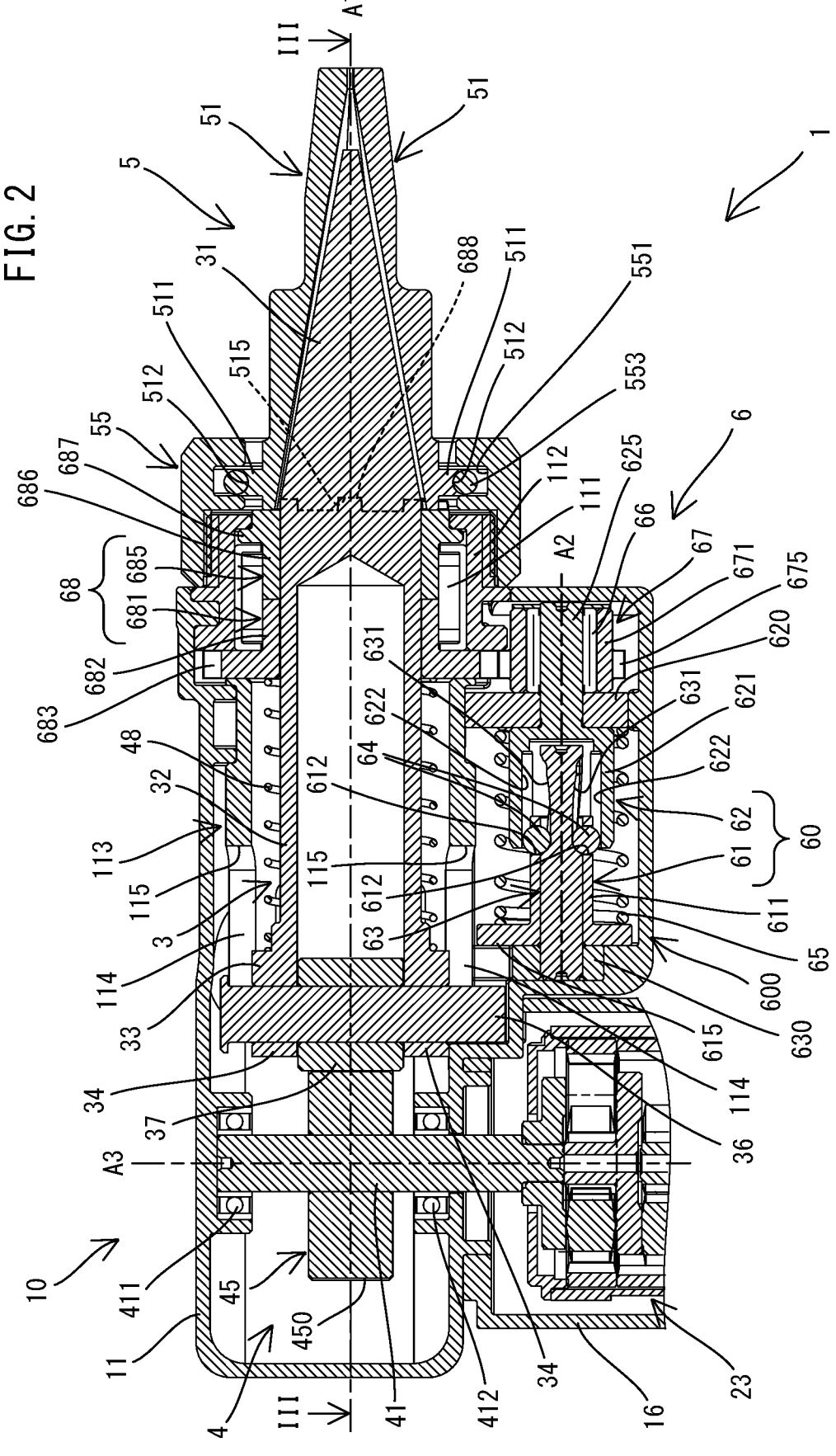
FIG. 2 is a partial, enlarged view of FIG. 1.
Figure 3:
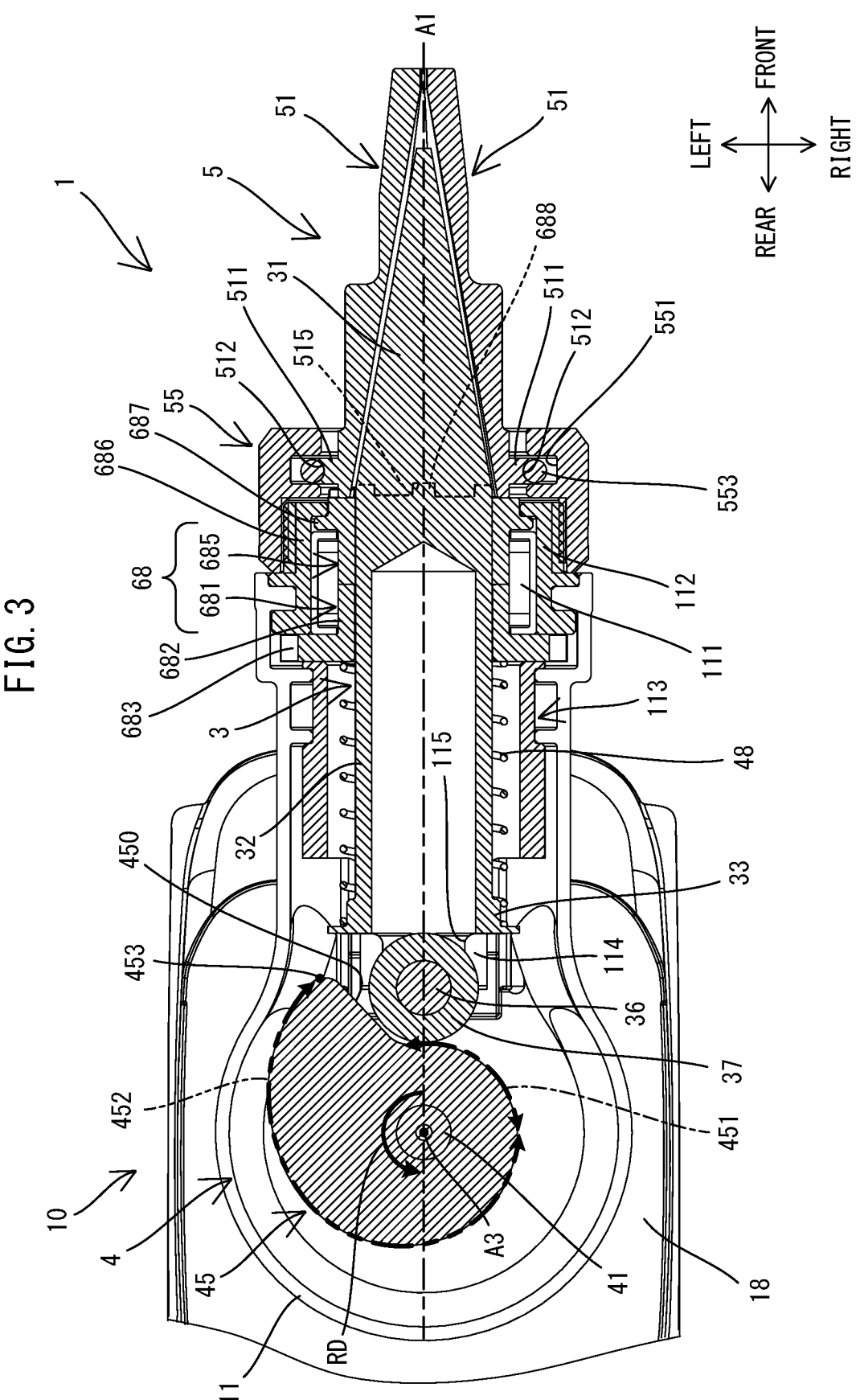
FIG. 3 is a sectional view taken along line III-III in FIG. 2.
Figure 4:
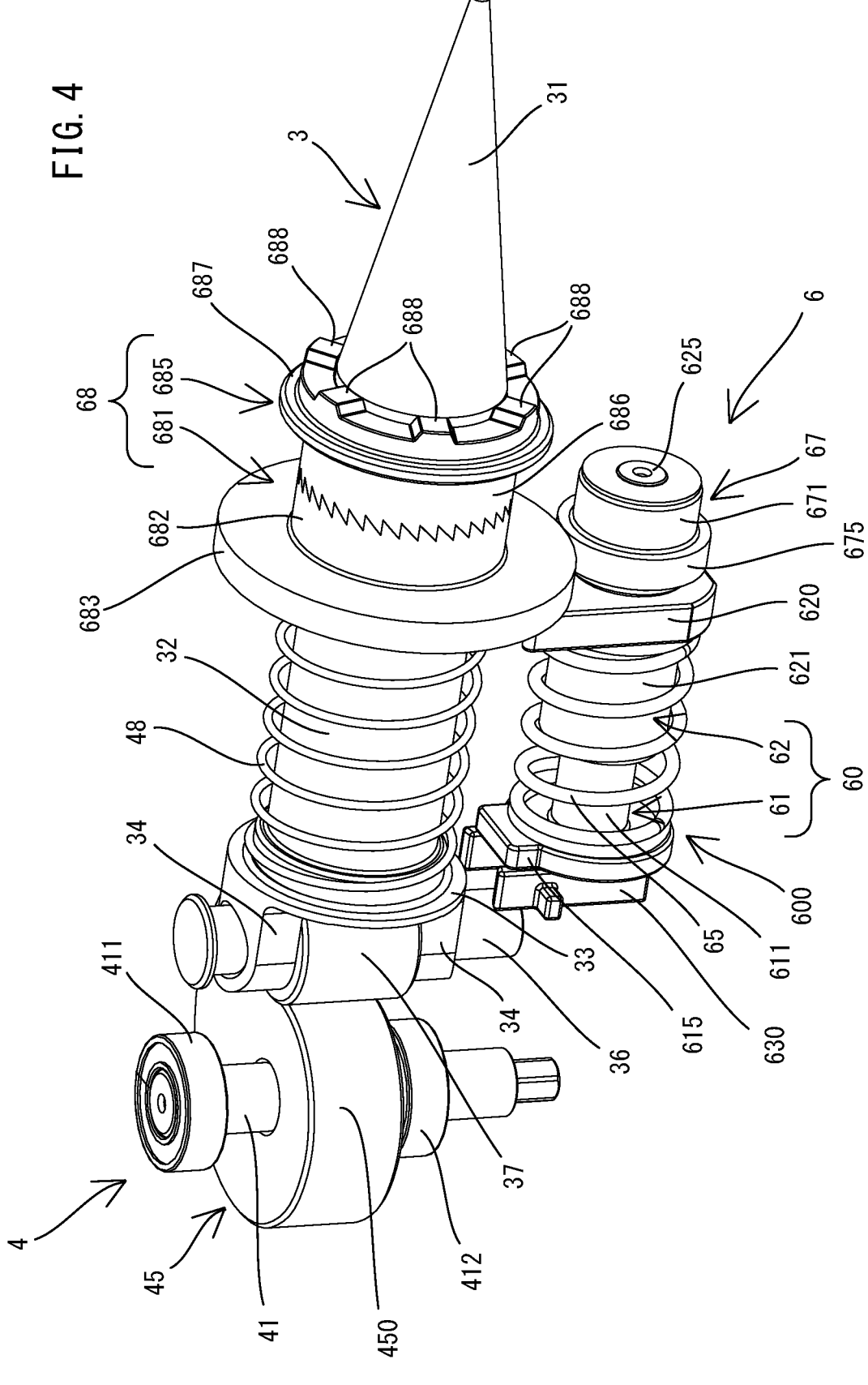
FIG. 4 is a perspective view of the wedge, a reciprocating mechanism and a rotating mechanism for the jaws, showing the state in which the wedge is in the first position.

As shown in FIGS. 2 to 4, the wedge 3 is an elongate member having a conical (tapered) front portion (hereinafter referred to as a conical part 31). More specifically, the front portion of the wedge 3 is configured such that the diameter gradually decreases toward the front end. The wedge 3 may also be referred to as a needle or a cone. In this embodiment, a portion of the wedge 3 that extends rearward from the conical part 31 is cylindrically shaped (this portion is hereinafter referred to as a cylindrical part 32). The wedge 3 also has a flange part 33 that is provided rearward of the cylindrical part 32 and that protrudes radially outward of an outer peripheral surface of the cylindrical part 32.

The wedge 3 is disposed within the housing 10 (the body part 11) such that its longitudinal axis coincides with the driving axis A1. The wedge 3 is held to be linearly movable relative to the housing 10 in a reciprocating manner in the front-rear direction along the driving axis A1. More specifically, a driven gear ring 68 is disposed within a front end portion of the body part 11. The driven gear ring 68 includes a first ring 681 and a second ring 685. The driven gear ring 68 is a portion of the rotating mechanism 6 for the jaws 51, as will be described in detail below. The driven gear ring 68 is supported by a bearing 111 such that the driven gear ring 68 is rotatable around the driving axis A1 and substantially immovable in the front-rear direction relative to the housing 10. The wedge 3 is coaxially inserted through the driven gear ring 68 and held to be slidable in the front-rear direction relative to the driven gear ring 68.

Further, a guide frame 113 substantially inhibits the wedge 3 from rotating around the driving axis A1. The guide frame 113 is held behind the driven gear ring 68 such that the guide frame 113 is substantially immovable relative to the housing 10 (the body part 11). A front half of the guide frame 113 is a tubular member and is disposed around the wedge 3. A rear half of the guide frame 113 is formed by two protruding parts 114 that respectively extend rearward from upper and lower rear ends of the front half. A guide groove 115 is formed in each of the upper and lower protruding parts 114. The two (upper and lower) guide grooves 115 extend forward from a rear end of the guide frame 113 directly above and directly below the driving axis A1, respectively.

A pin 36 is engaged with a rear end portion of the wedge 3. More specifically, two protruding parts 34 protrude rearward from the flange part 33 of the wedge 3. The protruding parts 34 are symmetrically arranged relative to the longitudinal axis of the wedge 3. Each of the protruding parts 34 has a through hole. The through hole extends through the protruding part 34 in a direction that is orthogonal to the longitudinal axis of the wedge 3. The pin 36 is inserted through the through holes of the protruding parts 34 and thus engaged with the wedge 3. Two axial end portions of the pin 36 protrude radially outward of the wedge 3 from the protruding parts 34, and are respectively arranged within upper and lower guide grooves 115 such that the pin 36 is slidable in the front-rear direction. Thus, the pin 36 extends in the up-down direction and is movable integrally with the wedge 3 relative to the housing 10 in the front-rear direction.

Owing to such a holding structure, the wedge 3 is movable in the front-rear direction relative to the housing 10 (the body part 11) within a range in which the pin 36 can slide along the guide groove 115, without substantially rotating around the driving axis A1. The wedge 3 is always biased rearward relative to the housing 10 and the jaw assembly 5 by the biasing spring 48. More specifically, the biasing spring 48 is a compression coil spring and is disposed around (radially outside of) the wedge 3. One end of the biasing spring 48 abuts on a rear surface of the driven gear ring 68 from the rear, and the other end of the biasing spring 48 abuts on a front surface of the flange part 33 of the wedge 3 from the front.

Further, a roller 37 is disposed between the two protruding parts 34 of the wedge 3 in the up-down direction around the pin 36. The roller 37 is rotatable around an axis of the pin 36 relative to the pin 36. A cam 45 of the reciprocating mechanism 4 is arranged directly behind the roller 37. The roller 37 is always held in abutment (contact) with the cam 45 (a cam face 450) since the wedge 3 is biased rearward relative to the housing 10.

As shown in FIGS. 2 to 4, the reciprocating mechanism 4 is operably coupled to or engaged with the motor 20 and the wedge 3. The reciprocating mechanism 4 is configured to be driven by the motor 20 to reciprocate the wedge 3 along the driving axis A1. The reciprocating mechanism 4 of this embodiment includes the driving shaft 41, the cam 45 and the biasing spring 48.

The driving shaft 41 extends in the up-down direction, and is rotatably supported at its upper and lower ends by bearings 411, 412 that are supported within the housing 10 (the body part 11). As described above, the driving shaft 41 is rotationally driven by the motor 20 around the axis A3 that extends in the up-down direction.

The cam 45 is a member that is configured to convert rotation into linear motion. The cam 45 is fixed around the driving shaft 41 such that the cam 45 rotates integrally with the driving shaft 41. Specifically, the cam 45 is fixed around the driving shaft 41 between the bearings 411, 412 in the up-down direction. In this embodiment, the cam 45 is a plate cam (a disc cam, a radial cam), in which the distance from the rotational axis to an outer peripheral surface of the cam is not uniform. Specifically, the cam face 450 includes (i) a minimum-diameter part 451 whose distance from the rotational axis (the axis A3) is minimum, (ii) a diameter-varying part 452 whose distance from the axis A3 gradually increases as the cam 45 rotates, and (iii) a maximum-diameter part 453 whose distance from the axis A3 is maximum.

As described above, the roller 37 is operably coupled to the wedge 3 and always pressed against the outer peripheral surface (the cam face 450) of the cam 45 by the biasing force of the biasing spring 48. Thus, the wedge 3 reciprocates in the front-rear direction as the roller 37 rolls along the cam face 450, while the driving shaft 41 and the cam 45 are rotationally driven in one direction (in the direction of an arrow RD in FIG. 3) around the axis A3 by the motor 20.

Figure 5:
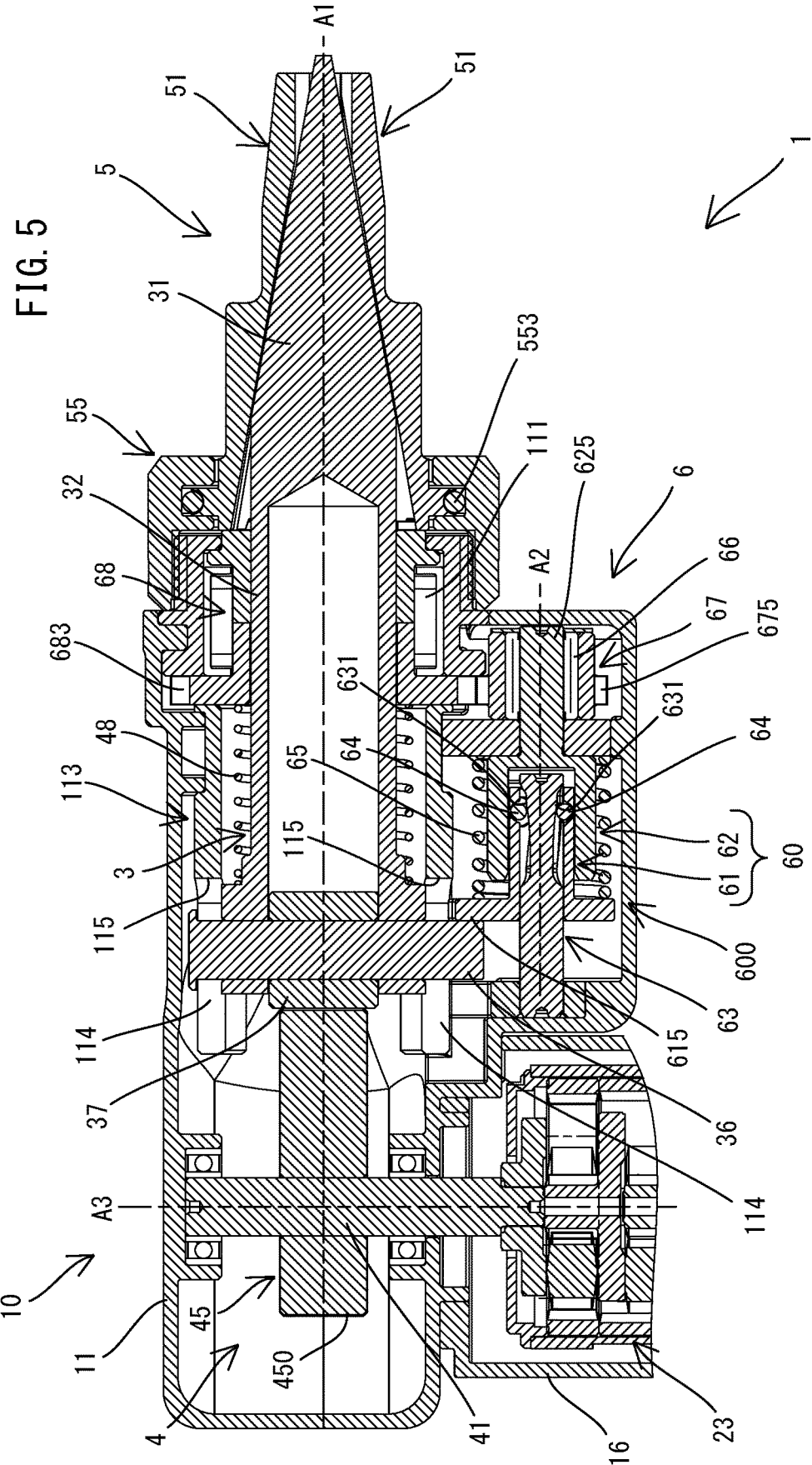
FIG. 5 is a sectional view corresponding to FIG. 2, showing a state in which the wedge is in a second position and the jaws are in an open position
Figure 6:
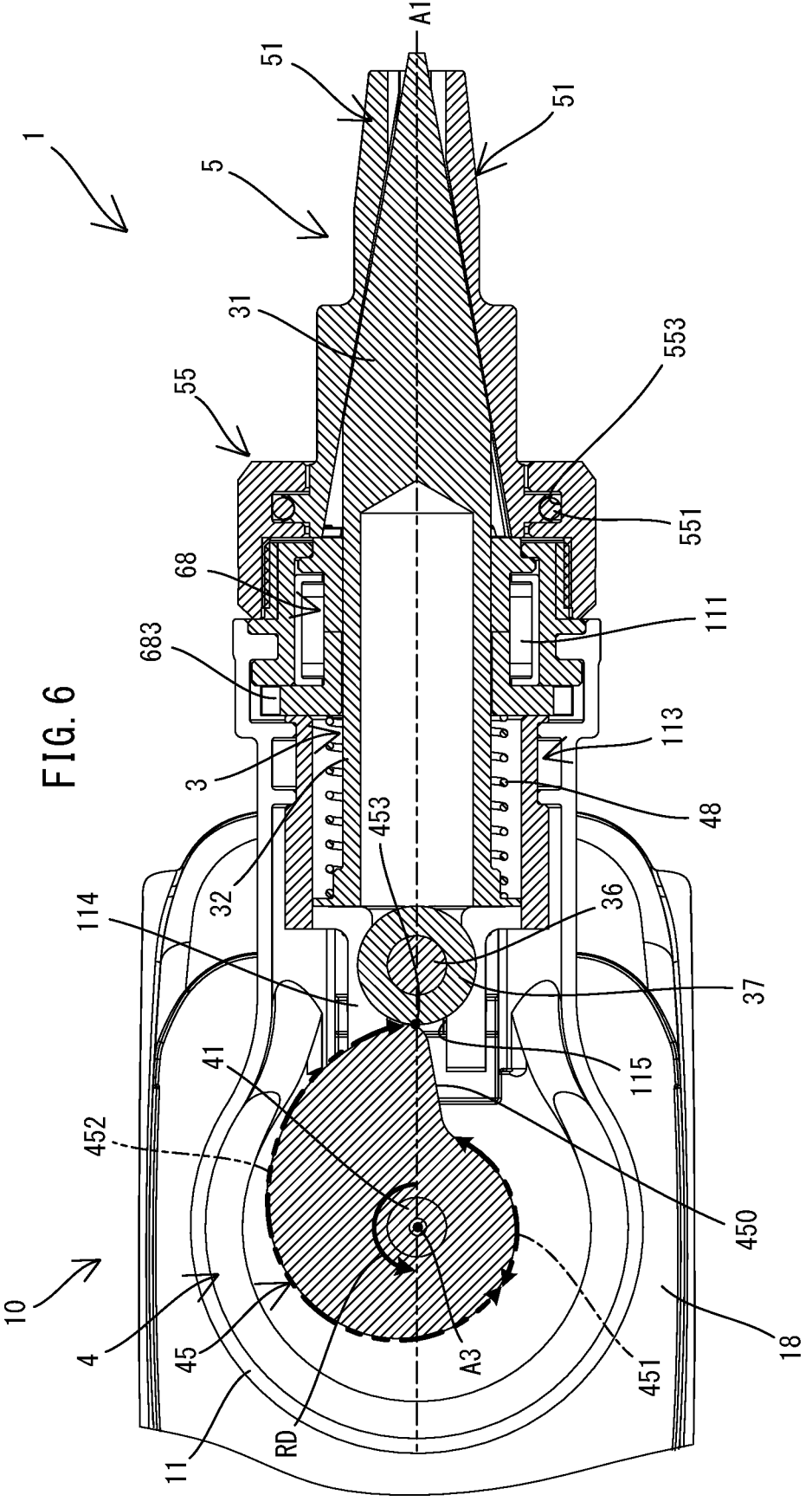
FIG. 6 is a sectional view corresponding to FIG. 3, showing a state in which the wedge is in the second position and the jaws are in the open position.

More specifically, the wedge 3 is held in a rearmost position (hereinafter also referred to as a first position) within its movable range as shown in FIGS. 2 and 3, while the minimum-diameter part 451) is in abutment (contact) with the roller 37. The wedge 3 moves forward from the first position, while the diameter-varying part 452 is in abutment (contact) with the roller 37. As shown in FIGS. 5 and 6, when the maximum-diameter part 453 abuts on the roller 37, the wedge 3 reaches a frontmost position (hereinafter also referred to as a second position) within its movable range. When the roller 37 passes the maximum-diameter part 453 as the cam 45 rotates, the minimum-diameter part 451 faces the roller 37, and the wedge 3 is moved rearward from the second position to the first position by the biasing force of the biasing spring 48.

Thus, in this embodiment, one cycle of reciprocating movement of the wedge 3 is defined by (i) a waiting phase in which the wedge 3 is held in the first position, (ii) a movement phase (hereinafter referred to as an forward movement phase) in which the wedge 3 moves from the first position to the second position, and (iii) a movement phase (hereinafter referred to as a backward movement phase) in which the wedge 3 moves from the second position to the first position.

The structure of the jaw assembly 5 is now described in detail.

Figure 8:
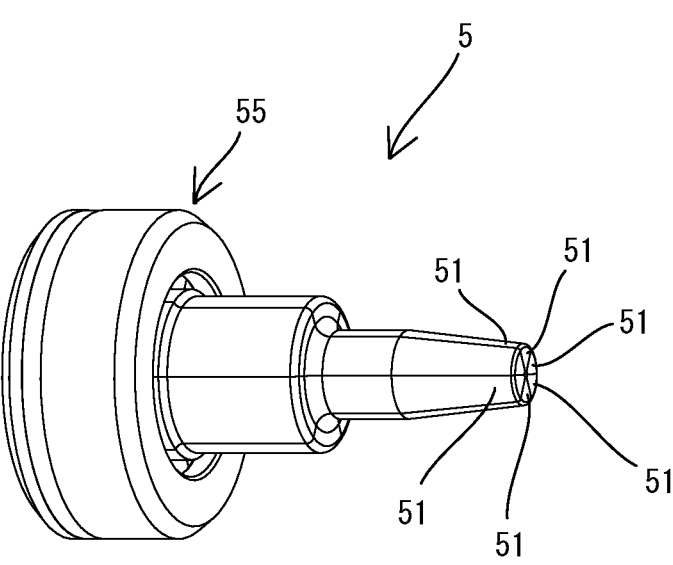
FIG. 8 is a perspective view of a jaw assembly.

As shown in FIGS. 2, 3 and 8, the jaw assembly 5 of this embodiment includes the jaws 51 and a cap 55. The jaw assembly 5 may also be referred to as an expansion head. The jaws 51 may also be referred to as chucks or claws. The cap 55 may also be referred to as a collar or a jaw holder.

The jaws 51 have substantially the same shape and are arranged around the driving axis A1. In this embodiment, six jaws 51 are provided. A front end portion (a distal end portion) of each jaw 51 is substantially shaped like a fan that has a central angle of 60 degrees as viewed from the front. A projection 511 is provided on a rear end of each of the jaws 51 and protrudes radially outward. A groove 512 having a circular arc section is formed in a protruding end (outer edge) of the projection 511. Further, the rear end of the jaw 51 has a recess 515 that is recessed forward from the rear end of the jaw 51.

The cap 55 is configured to hold the jaws 51 to be rotatable around the driving axis A1 and to be movable in the radial direction relative to the driving axis A1. The cap 55 is basically a cylindrical member. The cap 55 is removably connected to a front end portion of the housing 10 (the body part 11). In this embodiment, the cap 55 is screwed onto the front end portion of the body part 11. Alternatively, the cap 55 may be connected to the body part 11 in a different manner.

An annular recess 551 is formed in the inside of the cap 55. The jaws 51 are held by the cap 55 with their respective projections 511 within the recess 551. The recess 551 provides a space that is large enough for the projections 511 to move in the radial direction within the recess 551. An annular elastic member 553 is fitted in the grooves 512 of the projections 511 such that the elastic member 553 surrounds all the jaws 51. Thus, the jaws 51 are always biased radially inward (toward the driving axis A1 and the wedge 3).

Owing to such a structure, the jaws 51 move in the radial direction as the wedge 3 reciprocates along the driving axis A1. More specifically, as shown in FIGS. 2 and 3, when the wedge 3 is at (in) the first position (the rearmost position), the jaws 51 are closest to the driving axis A1 in the radial direction, owing to the biasing force of the elastic member 553. This position of the jaws 51 in the radial direction is hereinafter also referred to as a closed position.

When the wedge 3 moves forward from the first position to the second position, an outer peripheral surface of the conical part 31 of the wedge 3 abuts on inner peripheral surfaces of the jaws 51 halfway in the forward movement phase of the wedge 3, and moves the jaws 51 radially outward. As shown in FIGS. 5 and 6, when the wedge 3 is at (in) the second position, the jaws 51 are farthest from the driving axis A1 in the radial direction. This position of the jaws 51 in the radial direction is hereinafter also referred to as an open position.

Further, when the wedge 3 moves rearward from the second position to the first position, the jaws 51 are biased by the elastic member 553 to move radially inward as the wedge 3 moves rearward, and return to the closed position halfway in the backward movement phase of the wedge 3.

The structure of the rotating mechanism 6 for the jaws 51 is now described in detail.

Figure 9:
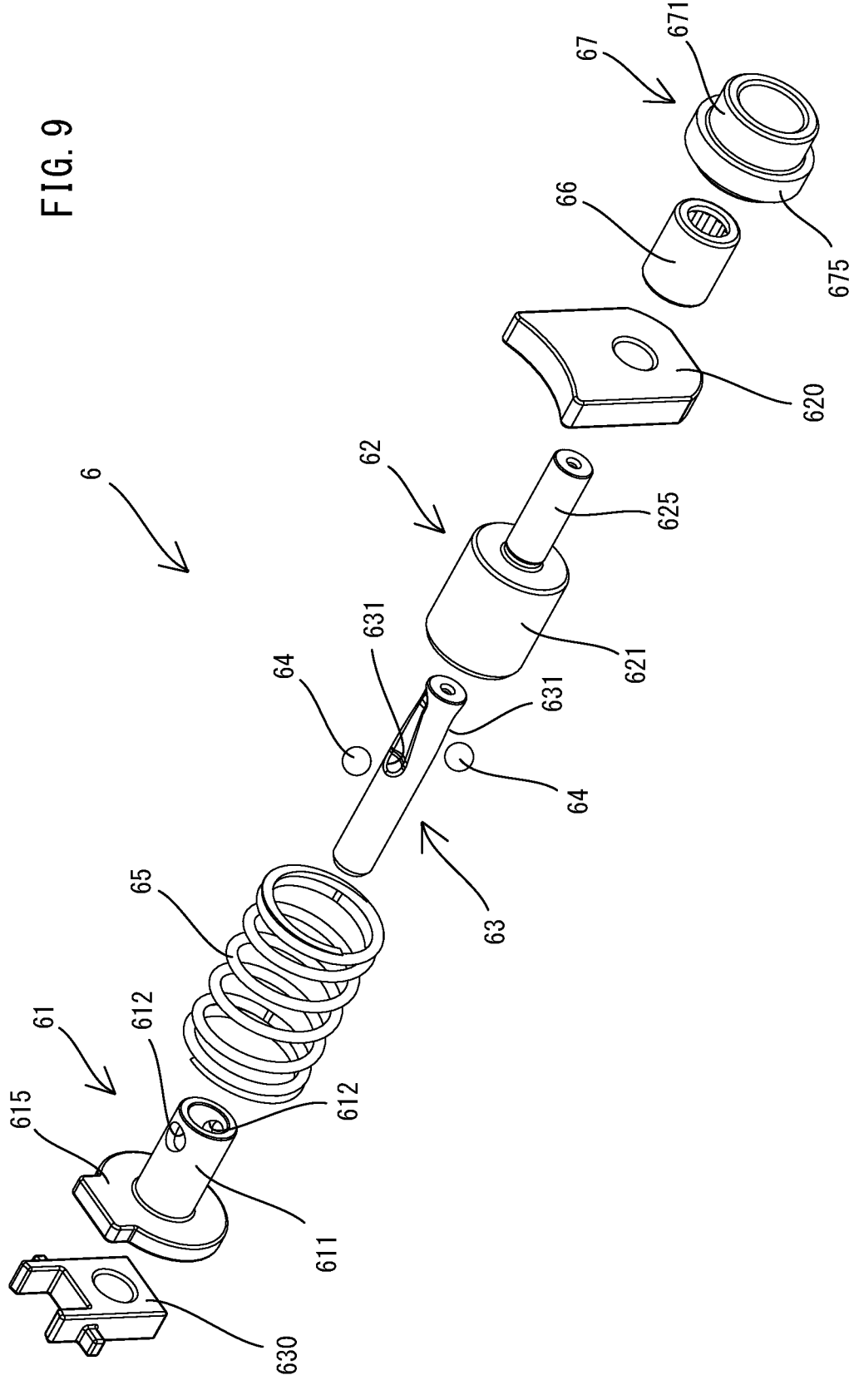
FIG. 9 is an exploded, perspective view of the rotating mechanism (except for a driven gear ring) for the jaws.

As shown in FIGS. 2, 4 and 9, the rotating mechanism 6 of this embodiment includes a fixed shaft 63, a rotary shaft 60, a biasing spring 65, a one-way clutch 66, a driving gear ring 67 and the driven gear ring 68.

The fixed shaft 63 is supported to be substantially immovable relative to the housing 10 (the body part 11). The fixed shaft 63 extends along the axis A2 parallel to the driving axis A1. More specifically, a rear end of the fixed shaft 63 is press-fitted into a support hole of a support plate 630, which is fixedly supported by the body part 11, and thus fixed. The fixed shaft 63 extends in the front-rear direction directly below the wedge 3. Two cam grooves 631 are formed in an outer peripheral surface of the fixed shaft 63. The cam grooves 631 are symmetrically arranged relative to the longitudinal axis of the fixed shaft 63 (the axis A2). Each of the cam grooves 631 extends obliquely (spirally, helically) relative to the axial direction and the circumferential direction of the fixed shaft 63.

The rotary shaft 60 is coaxial with the fixed shaft 63 and supported to be rotatable around the axis A2 relative to the fixed shaft 63. In this embodiment, the rotary shaft 60 includes a first member 61 and a second member 62 that are coaxial with each other and operably connected to each other.

The first member 61 includes a cylindrical part 611 and a flange part 615 that is formed on one axial end of the cylindrical part 611. The first member 61 is fitted onto (around) the fixed shaft 63 with the flange part 615 on the rear side. A portion of the flange part 615 is always located directly in front of the lower end portion of the pin 36 (specifically, a portion protruding downward from the lower protruding part 34 of the wedge 3). Thus, a line that extends parallel to the axis A2 (in the front-rear direction) passes through the portion of the flange part 615 and the lower end portion of the pin 36. Further, two circular ball holding holes 612 are formed in the cylindrical part 611. The ball holding holes 612 are symmetrically arranged relative to the axis of the first member 61. Two balls 64 are rollably fitted and held in the ball holding holes 612, respectively. The balls 64 are partially within the respective cam grooves 631 of the fixed shaft 63 to be rollable within the cam grooves 631.

Owing to such a structure, the first member 61 is coupled to the fixed shaft 63 via the balls 64. The first member 61 can rotate around the axis A2 while moving in the front-rear direction relative to the housing 10 (the body part 11) within a range in which the balls 64 can roll along the cam grooves 631. Thus, the fixed shaft 63 and the first member 61, which is operably engaged with the fixed shaft 63 via the balls 64, form a motion converting mechanism 600 that is configured to convert linear motion into rotation (rotary motion).

The second member 62 includes a bottomed (cup-shaped) cylindrical part 621 and a shaft part 625 protruding from a central portion of a bottom of the cylindrical part 621. The second member 62 is supported to be rotatable relative to the housing 10 (the body part 11) and substantially immovable in the front-rear direction, with the cylindrical part 621 on the rear side and the shaft part 625 protruding forward. Further, the second member 62 is coupled to the first member 61 such that the second member 62 rotates integrally with the first member 61 relative to the fixed shaft 63 while allowing the first member 61 to move in the front-rear direction relative to the second member 62.

Figure 10:
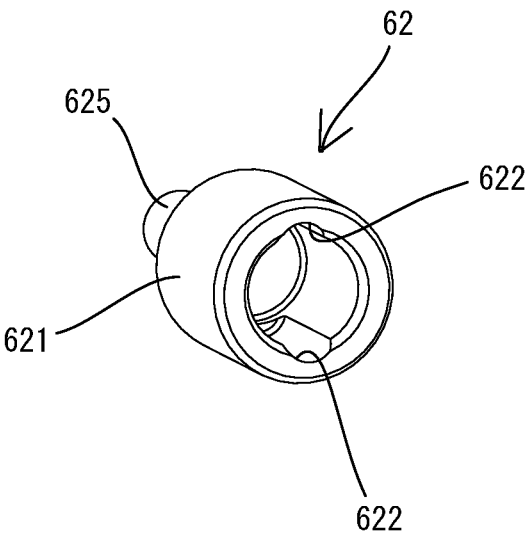
FIG. 10 is a perspective view of a second member of a rotary shaft.

More specifically, a support plate 620 with a support hole is fixedly held in front of the support plate 630 within the body part 11. The shaft part 625 is inserted through the support hole of the support plate 620 and rotatably supported by the support plate 620. A portion of the shaft part 625 protrudes forward of the support plate 620. The inner diameter of the cylindrical part 621 of the second member 62 is larger than the outer diameter of the cylindrical part 611 of the first member 61, and a portion of the cylindrical part 621 is disposed around (radially outside of) the cylindrical part 611. Two ball guide grooves 622 are formed in an inner peripheral surface of the cylindrical part 621. The ball guide grooves 622 are symmetrically arranged relative to the axis of the second member 62 (the axis A2), and extend linearly in the axial direction (see FIG. 10). The balls 64 held in the ball holding holes 612 of the cylindrical part 611 partially protrude radially outward from the cylindrical part 611 and are engaged with the ball guide grooves 622.

Owing to such a structure, the second member 62 is coupled to the first member 61 via the balls 64. When the first member 61 rotates around the axis A2 while moving in the front-rear direction relative to the fixed shaft 63, the second member 62 rotates integrally with the first member 61 while allowing the first member 61 to move in the front-rear direction relative to the second member 62.

he biasing spring 65 is a compression coil spring. The biasing spring 65 is disposed between the support plate 620 and the first member 61 in the front-rear direction in a slightly compressed state (loaded state). More specifically, front and rear ends of the biasing spring 65 abut on a rear surface of the support plate 620 and a front surface of the flange part 615, respectively. The biasing spring 65 biases the first member 61 away from the support plate 620 (i.e. rearward relative to the fixed shaft 63 and the second member 62). Therefore, in an initial state in which a forward external force is not applied to the first member 61, the first member 61 is held in a rearmost position (hereinafter also referred to as an initial position) where a rear surface of the flange part 615 abuts on a front surface of the support plate 630. It is preferable that the biasing spring 65 is in a slightly compressed state in the initial state, but the biasing spring 65 may be disposed between the support plate 620 and the first member 61 in a substantially non-compressed state.

The coil diameter of the biasing spring 65 is slightly larger than the outer diameter of the cylindrical part 621 of the second member 62. The biasing spring 65 is disposed around (radially outside of) the cylindrical part 621. Thus, the cylindrical part 611 of the first member 61, the cylindrical part 621 of the second member 62 and a portion of the fixed shaft 63 are inside (radially inside) of the biasing spring 65. Owing to such a structure, a space occupied by the fixed shaft 63, the rotary shaft 60 and the biasing spring 65 can be relatively small, so that the relatively compact rotating mechanism 6 is achieved.

The one-way clutch 66 is configured to transmit rotation only in one direction and to idle in an opposite direction. The one-way clutch 66 of this embodiment is a general purpose one-way clutch, which includes a cylindrical outer ring and a plurality of rolling elements (clutch members) disposed within the outer ring. Rollers (specifically, needle rollers) are employed as the rolling elements in this embodiment. However, any one-way clutch having a structure different from this may be employed. The one-way clutch 66 is between the rotary shaft 60 and the driving gear ring 67, and configured to transmit only rotation of the rotary shaft 60 in one prescribed direction to the driving gear ring 67.

The driving gear ring 67 is an annular or ring-like (cylindrical) member having a gear. More specifically, the driving gear ring 67 includes a cylindrical part 671 and a gear teeth 675 protruding radially outward from an outer peripheral surface of the cylindrical part 671. The outer ring of the one-way clutch 66 is press-fitted into and fixed to an inner peripheral surface of the cylindrical part 671 of the driving gear ring 67. Further, the portion of the shaft part 625 of the second member 62 that protrudes forward of the support plate 620 is inserted through the one-way clutch 66.

The driven gear ring 68 is an annular or ring-like (cylindrical) member having a gear. The driven gear ring 68 is disposed around the wedge 3 to be coaxial with the wedge 3, as described above. The driven gear ring 68 is operably engaged with the driving gear ring 67 and the jaws 51. The driven gear ring 68 is configured to be rotated by the driving gear ring 67 to rotate integrally with the jaws 51. In this embodiment, the driven gear ring 68 includes a first ring 681 and a second ring 685 that are coaxially connected to each other such that the first ring 681 and the second ring 685 integrally rotate.

The first ring 681 is a gear ring (an annular (cylindrical) member having a gear). Specifically, the first ring 681 includes a cylindrical part 682 and a gear teeth 683 formed around a rear end of the cylindrical part 682. The gear teeth 683 mesh (is engaged) with the gear teeth 675 of the driving gear ring 67.

The second ring 685 is an annular (cylindrical) member having a flange. Specifically, the second ring 685 includes a cylindrical part 686, a flange 687 formed around a front end of the cylindrical part 686, and a plurality of projections 688 protruding forward from a front end of the cylindrical part 686. The projections 688 are arranged at equal intervals in the circumferential direction. In this embodiment, the number of projections 688 is six, corresponding the number of the jaws 51. Each of the projections 688 is configured to engage with the recess 515 formed at the rear end of the jaw 51. The second ring 685 and the jaws 51 are connected to each other to be integrally rotatable by engagement between the projections 688 and the recesses 515 of the jaws 51.

The first ring 681 and the second ring 685 are connected such that the first ring 681 and the second ring 685 rotate integrally (in one piece) as the driven gear ring 68 by engagement between teeth formed in a front end of the first ring 681 and teeth formed in a rear end of the second ring 685 (see FIG. 4). The driven gear ring 68 is supported to be rotatable around the driving axis A1 relative to the housing 10 (the body part 11) by the common bearing 111 that is disposed between the gear teeth 683 of the first ring 681 and the flange 687 of the second ring 685 in the front-rear direction. The bearing 111 is fixed to an inner peripheral surface of a holding sleeve 112, which is fixedly supported within the body part 11. The driven gear ring 68 is supported to be substantially immovable in the front-rear direction relative to the housing 10 (the body part 11) by the holding sleeve 112 and the guide frame 113.

As described above, the driven gear ring 68 of this embodiment is formed by the two separate members (the first and second rings 681, 685) for ease of assembly, but the driven gear ring 68 may be formed as a single (inseparable) member.

The rotating mechanism 6 having the above-described structure rotates the jaws 51 only in one direction around the driving axis A1 by the elastic force (elastic energy, restoring force) of the biasing spring 65. Operation of the rotating mechanism 6 is now described.

When a forward external force (a pressing force) is applied to the first member 61, the first member 61 of the rotary shaft 60 rotates in a prescribed direction around the axis A2 while moving forward from the initial position relative to the fixed shaft 63, while compressing (elastically deforming) the biasing spring 65. In the meantime, the second member 62 rotates together with the first member 61 in the prescribed direction while allowing the forward movement of the first member 61, without moving in the front-rear direction relative to the fixed shaft 63. The direction in which the rotary shaft 60 rotates when the first member 61 moves forward relative to the fixed shaft 63 and the housing 10 is hereinafter referred to as a first direction. The first member 61 causes the biasing spring 65 to store (accumulate) an elastic force (elastic energy) (i.e., the first member 61 applies elastic load to the biasing spring 65) by compressing (elastically deforming) the biasing spring 65 while moving forward from the initial position.

The one-way clutch 66 idles relative to the shaft part 625 of the second member 62 and does not transmit rotation to the driving gear ring 67 when the rotary shaft 60 rotates in the first direction. In other words, even if the rotary shaft 60 rotates in the first direction, the driving gear ring 67 is not rotated. Thus, the driven gear ring 68 and the jaws 51 are not rotated either.

When the forward external force (pressing force) against the first member 61 is released after the first member 61 is moved forward from the initial position, the first member 61 is biased rearward by the elastic force (elastic energy, restoring force) stored in the biasing spring 65. Thus, the first member 61 rotates around the axis A2 in a second direction, which is opposite to the first direction, while moving rearward. In the meantime, the second member 62 rotates together with the first member 61 in the second direction while allowing rearward movement of the first member 61, without moving in the front-rear direction relative to the fixed shaft 63. In this manner, the rotary shaft 60 is rotated in the second direction by the elastic force stored in the biasing spring 65.

When the rotary shaft 60 rotates in the second direction, the one-way clutch 66 is locked to the shaft part 625 of the second member 62 and rotates integrally with the rotary shaft 60, thereby transmitting rotation to the driving gear ring 67. In other words, the driving gear ring 67 rotates integrally with the rotary shaft 60 in the second direction. Thus, the driven gear ring 68 and the jaws 51 are rotated around the driving axis A1 relative to the housing 10 as the driving gear ring 67 rotates. In this manner, the driven gear ring 68 and the jaws 51 are rotated in one specific direction around the driving axis A1 only when the rotary shaft 60 is rotated in the second direction by the elastic force stored in the biasing spring 65.

Further, in this embodiment, the rotating mechanism 6 is configured such that the movement of the first member 61 in the front-rear direction partly corresponds to the movement of the wedge 3 in the front-rear direction. The correspondence between operation of the reciprocating mechanism 4 and the wedge 3 and the operation of the rotating mechanism 6 is now described.

While the cam 45 is rotated by the motor 20 and the diameter-varying part 452 of the cam face 450 is in abutment with the roller 37, the cam 45 moves the wedge 3 from the first position (the rearmost position) to the second position (the frontmost position) via the roller 37 and the pin 36. As described above, in a portion (i.e., not an entirety) of this forward movement phase, the wedge 3 moves the jaws 51 from the closed position to the open position (see FIGS. 5 and 6).

Figure 7:
FIG. 7 is a perspective view of the wedge, the reciprocating mechanism, the rotating mechanism for the jaws, and a holding sleeve, showing the state in which the wedge is in the second position.

Further, corresponding to a portion of the forward movement phase of the wedge 3, the lower end portion of the pin 36 abuts on (comes into contact with) the rear surface of the flange 615 of the first member 61 and moves the first member 61 forward. Specifically, as shown in FIGS. 2 and 4, when the wedge 3 is at the first position, the lower end portion of the pin 36 is spaced apart rearward from the first member 61 located at the initial position. This position of the pin 36 in the front-rear direction is hereinafter referred to as a separate position. When the wedge 3 moves a prescribed distance forward from the first position in the forward movement phase, the lower end portion of the pin 36 abuts on the rear surface of the flange 615 from the rear. This position of the pin 36 in the front-rear direction is hereinafter referred to as an abutting position. Thereafter, as shown in FIGS. 5 and 7, as the wedge 3 moves forward to the second position, the pin 36 moves the first member 61 forward while moving forward from the abutting position. In the meantime, as described above, the rotary shaft 60 rotates in the first direction and thus the one-way clutch 66 is not actuated, so that the jaws 51 are not rotated.

When the cam 45 is further rotated by the motor 20 and the roller 37 passes the maximum-diameter part 453 of the cam face 450, the minimum-diameter part 451 faces the roller 37, so that the wedge 3 moves rearward from the second position to the first position. As described above, in a portion of this backward movement phase of the wedge 3, the jaws 51 move from the open position to the closed position (see FIGS. 2 and 3).

Further, corresponding to a portion of the backward movement phase of the wedge 3, the first member 61 is moved rearward by the elastic force of the biasing spring 65. Specifically, the forward pressing force of the lower end portion of the pin 3 applied to the first member 61 is released substantially simultaneously when the minimum-diameter part 451 faces the roller 37. Therefore, the first member 61 is rotated in the second direction while being moved rearward by the elastic force stored in the biasing spring 65, and thus the second member 62 is also rotated in the second direction. Thus, as described above, the one-way clutch 66 is actuated, and the jaws 51 are rotated via the driving gear ring 67 and the driven gear ring 68.

An angle by which the jaws 51 are rotated (a rotation angle of the jaws 51) while the first member 61 moves rearward along the cam grooves 631 is indirectly defined by the cam grooves 631. More specifically, the rotation angle of the driving gear ring 67 is directly defined by the cam grooves 631. The driving gear ring 67 and the driven gear ring 68 form a speed reducing mechanism, so that the rotation angles of the driven gear ring 68 and the jaws 51 become smaller than the rotation angle of the driving gear ring 67 according to the gear ratio of the speed reducing mechanism.

Thus, in this embodiment, the rotary shaft 60 and thus the driven gear ring 68 and the jaws 51 are rotated in the second direction, not by the force applied by the cam 45 and the pin 36, but by the elastic force of the biasing spring 65. Further, in the backward movement phase of the wedge 3, the rearward movement of the wedge 3 is simply caused by the elastic force of the biasing spring 48, although the rearward movement of the wedge 3 is synchronized with the rotation of the cam 45. The rotation of the driven gear ring 68 and the jaws 51 is caused in a portion of the backward movement phase of the wedge 3, but not mechanically interlocked with the rearward movement of the wedge 3.

As described above, in the pipe expanding tool 1 of this embodiment, the rotating mechanism 6 includes the driven gear ring 68 that is rotated by the elastic force (elastic energy, restoring force) of the biasing spring 65, and causes the jaws 51 to rotate via the driven gear ring 68. Therefore, even if the driven gear ring 68 is forced to rotate the jaws 51 while the jaws 51 cannot be rotated for some reason, any force that exceeds the elastic force of the biasing spring 65 is not applied to the driven gear ring 68 and other members of the rotating mechanism 6. This effectively reduces the possibility of damage to the rotating mechanism 6 due to excessive load thereon. Further, a mechanical clutch mechanism may be employed as a countermeasure when the jaws 51 cannot be rotated for some reason. However, in such a mechanical clutch mechanism, torque for interrupting transmission needs to be strictly adjusted. On the contrary, the rotating mechanism 6 of this embodiment does not require such troublesome adjustment.

In this embodiment, the rotating mechanism 6 rotates the jaws 51, corresponding to a portion of the backward movement phase of the wedge 3 in which the wedge 3 moves from the second position to the first position. Therefore, after expanding an end of a pipe, the jaws 51 rotate while returning from the open position to the closed position (i.e., while moving away from an inner peripheral surface of the expanded pipe). Thus, the possibility that the jaws 51 are affected by the inner peripheral surface of the pipe can be reduced, so that the rotating mechanism 6 can smoothly rotate the jaws 51.

In this embodiment, the rotating mechanism 6 causes the biasing spring 65 to store the elastic force, corresponding to a portion of the forward movement phase of the wedge 3 in which the wedge 3 moves from the first position to the second position. Further, the rotating mechanism 6 rotates the jaws 51 by the elastic force stored in the biasing spring 65, corresponding to a portion of the backward movement phase of the wedge 3 in which the wedge 3 moves from the second position to the first position. Thus, the phase of storing the elastic force in the biasing spring 65 and the phase of rotating the jaws 51 by the elastic force stored in the biasing spring 65 rationally correspond to the two different movement phases of the wedge 3, respectively.

In this embodiment, the first member 61 elastically deforms the biasing spring 65 by moving, corresponding to a portion of the forward movement phase of the wedge 3, thereby efficiently causing the biasing spring 65 to store the elastic force. Particularly, the pin 36, which is linearly moved by the power of the motor 20, is utilized to move the first member 61 forward. The pin 36 also serves to move the wedge 3 forward. Thus, the structure for moving the first member 61 is achieved without increasing the number of parts (parts count).

Further, in this embodiment, the rotary shaft 60 rotates in the first direction, corresponding to a portion of the forward movement phase of the wedge 3, and rotates in the second direction, corresponding to a portion of the backward movement phase of the wedge 3. The one-way clutch 66 disposed between the rotary shaft 60 and the driving gear ring 67 transmits to the jaws 51 only the rotation of the rotary shaft 60 in the second direction and does not transmit the rotation of the rotary shaft 60 in the first direction. Thus, while utilizing the rotary shaft 60 that is rotatable in two opposite directions (i.e., the first and second directions) around the axis A2, the one-way clutch 66 can achieve the rotating mechanism 6 with a rational structure that rotates the jaws 51 only while the rotary shaft 60 rotates in the second direction by the elastic force of the biasing spring 65, corresponding to a portion of the backward movement phase.

In this embodiment, the fixed shaft 63 and the rotary shaft 60 (specifically, the first member 61) that is operably engaged with the fixed shaft 63 via the balls 64 form the motion converting mechanism 600 that converts linear motion into rotation. The motion converting mechanism 600 is actuated by the elastic force of the biasing spring 65 to cause the driven gear ring 68 and the jaws 51 to rotate, corresponding to at least a portion of the backward movement phase of the wedge 3. Thus, the jaws 51 are efficiently rotated by the elastic force of the biasing spring 65 by utilizing the motion converting mechanism 600. Particularly, in this embodiment, linear motion of the first member 61 is converted into rotation of the first member 61, so that the motion converting mechanism 600 is compact in the axial direction.

In this embodiment, the rotary shaft 60 includes the first member 61 and the second member 62 that are coupled to each other such that the first member 61 and the second member 62 are integrally rotatable around the axis A2 and are movable relative to each other in the extending direction of the axis A2 (i.e., in the front-rear direction). Owing to this structure, both the first member 61 and the second member 62 can be integrally rotated by simply moving only the first member 61 in the front-rear direction without moving the second member 62. Therefore, the second member 62 can rotate the driven gear ring 68 in a stable state via the driving gear ring 67.

The first member 61 not only causes the driven gear ring 68 and the jaws 51 to rotate by being rotated by the elastic force of the biasing spring 65, corresponding to a portion of the backward movement phase of the wedge 3, but also elastically deforms the biasing spring 65 by moving in the front-rear direction, corresponding to a portion of the forward movement phase of the wedge 3. Thus, the first member 61 with multiple functions achieves the rational rotating mechanism 6 that can cause the biasing spring 65 to store the elastic force and that can rotate the driven gear ring 68 and the jaws 51 by the stored elastic force.

Correspondences between the features of the above-described embodiment and the features of the present disclosure are as follows. The features of the above-described embodiment are merely exemplary and do not limit the features of the present disclosure.

The pipe expanding tool 1 is an example of a "pipe expanding tool". The wedge 3 is an example of a "wedge". The driving axis A1 is an example of a "first axis". The first (rearmost) position and the second (frontmost) position of the wedge 3 are examples of a "first position" and a "second position", respectively. The jaw 51 is an example of a "jaw". The closed position and the open position of the jaws 51 are examples of a "closed position" and a "open position", respectively. The biasing spring 65 is an example of a "spring". The driven gear ring 68 is an example of a "first rotary member". The backward movement phase of the wedge 3 is an example of a "first movement phase of the wedge in which the wedge moves from the second position to the first position". The forward movement phase of the wedge 3 is an example of a "second movement phase of the wedge in which the wedge moves from the first position to the second position".

The first member 61 is an example of a "movable member". The rotary shaft 60 is an example of a "second rotary member". Each of the first member 61 and the second member 62 is also an example of the "second rotary member". The one-way clutch 66 is an example of a "transmitting member". The motion converting mechanism 600 is an example of a "motion converting mechanism". The fixed shaft 63 is an example of a "fixed member". The balls 64 and the cam grooves 631 are examples of a "cam part". The first member 61 and the second member 62 of the rotary shaft 60 are examples of a "first part of the second rotary member" and a "second part of the second rotary member", respectively.

The above-described embodiment is a mere example and a pipe expanding tool according to the present disclosure is not limited to the pipe expanding tool 1 of the above-described embodiment. For example, the following non-limiting modifications may be made. At least one of these modifications may be employed in combination with at least one of the features of the pipe expanding tool 1 or at least one of the claimed features.

For example, the wedge 3 need not be driven by the motor 20. Similarly, in the rotating mechanism 6 for the jaws 51, the power for elastically deforming the biasing spring 65 is not limited to the power of the motor 20. Thus, the pipe expanding tool 1 need not include the motor 20. Instead, the pipe expanding tool may include a mechanism that is configured to move the wedge 3 forward and a mechanism that is configured to move the first member 61 in response to manual operation performed by a user. In another modification, a motor with a brush or an AC motor may be employed, in place of the brushless DC motor.

In the above-described embodiment, the pin 36, which is driven by the motor 20, has the function of moving the wedge 3 forward and the function of moving the first member 61 forward. Alternatively, a member that is configured to move the wedge 3 forward may be a different member from a member that is configured to abut on the first member 61 to move it forward. The shapes of these members and manners of connection, engagement and/or action between these members and the motor 20, the wedge 3 and the first member 61 may be appropriately changed.

The correspondence between the rearward movement of the wedge 3 and the rearward movement of the first member 61 caused by the elastic force of the biasing member 65 may be appropriately changed. In other words, the driven gear ring 68 and the jaws 51 may be rotated, corresponding to a different portion or an entirety of the backward movement phase of the wedge 3. For example, the first member 61 may be rotated while being moved rearward by the elastic force of the biasing member 65, corresponding to the middle or the latter half of the backward movement phase of the wedge 3, or the entirety of the backward movement phase of the wedge 3.

It may be sufficient for the reciprocating mechanism 4 for the wedge 3 to be configured to cause the wedge 3 to reciprocate. For example, a known crank mechanism including a crank shaft may be employed. Further, any kind of face (plane) cam (e.g., a face grooved cam) or a solid cam (e.g., a cylindrical grooved cam, a barrel cam) may be employed in place of a plate cam as the cam 45.

The structure of the jaw assembly 5 may be appropriately changed. For example, the shape and number of the jaws 51 and the manner in which the cap 55 holds the jaws 51 may be arbitrarily selected. Further, in order to allow replacement of the jaws 51 according to the kind of a pipe, like in this embodiment, it is preferable that the jaws 51 are part of the jaw assembly 5 that is removable from the housing 10.

Any modification may be made to the rotating mechanism 6, as far as it includes at least a spring and a rotary member that is engaged with the jaws such that the rotary member is integrally rotatable with the jaws and is configured to be rotated only in one direction around the driving axis A1 by the elastic force of the spring.

For example, in place of the biasing spring 65 (compression coil spring), any kind of spring (e.g., a tension spring, a torsion spring, a disc spring and a spiral spring) may be employed. Further, the movable member that acts on the spring to elastically deform (load) the spring and cause the spring to store (accumulate) the elastic force (elastic energy) is not limited to the first member 61. For example, the movable member may be a member that is configured to be driven and moved independently from the motion converting mechanism 600 by a motor or in response to manual operation by a user.

A motion converting mechanism having a different structure from the motion converting mechanism 600 of the above-described embodiment may be employed. For example, the motion converting mechanism may utilize a cam part of a different type (e.g., an inclined surface that is inclined relative to the extending direction of the axis A2 and the circumferential direction), in place of the balls 64 and the cam grooves 631.

In the above-described embodiment, the rotary shaft 60 that is rotatable in the two opposite directions (the first and second directions) around the axis A2 and the one-way clutch 66 are utilized to rotate the driven gear ring 68 only in one direction. Instead, the driven gear ring 68 may be rotated, for example, by a rotary member that does not rotate while the spring elastically deforms, corresponding to at least a portion of the forward movement phase of the wedge 3, but is rotated by the elastic force of the spring, corresponding to at least a portion of the backward movement phase or the waiting phase of the wedge 3.

Further, in view of the nature of the present disclosure and the above-described embodiment, the following aspects can be provided. At least one of the following aspects can be employed in combination with at least one of the pipe expanding tool 1 of the above-described embodiment and its modifications or the claimed features.

(Aspect 1)

The pipe expanding tool further comprises:

a housing that defines the first axis; and a motor that is housed within the housing, wherein the wedge is configured to be driven by the motor to be reciprocated.

According to this aspect, an efficient pipe expanding tool with the motor is provided. The housing 10 (the body part 11) and the motor 20 are examples of a "housing" and a "motor", respectively, in this aspect.

(Aspect 2)

The pipe expanding tool further comprises a cam that is operably coupled to the motor and configured to be rotationally driven by the motor to reciprocate the wedge along the first axis.

According to this aspect, rotation of the motor can be converted into linear motion to reciprocate the wedge with a simple structure. The cam 45 is an example of a "cam" in this aspect.

(Aspect 3)

The movable member is configured to be moved by power of the motor.

According to this aspect, an efficient structure is provided in which the motor moves the wedge and the movable member.

(Aspect 4)

The pipe expanding tool further comprises an abutting member that is configured to selectively come into contact with the movable member and move the movable member, corresponding to at least a portion of the second movement phase of the wedge.

According to this aspect, by utilizing the abutting member that is driven by the motor, the elastic force can be efficiently stored in the spring, corresponding to at least a portion of the second movement phase of the wedge in which the wedge moves from the first position to the second position. The pin 36 is an example of an "abutting member" in this aspect.

(Aspect 5)

The motion converting mechanism is configured to be selectively actuated by the motor, corresponding to at least a portion of the second movement phase of the wedge.

According to this aspect, a rational structure is provided that can convert linear motion into rotation by power of the motor in the second movement phase of the wedge, and that can convert linear motion into rotation by the elastic force of the spring in the first movement phase of the wedge.

(Aspect 6)

The movable member is included in the motion converting mechanism and is configured to elastically deform the spring by linearly moving along the second axis while rotating around the second axis.

According to this aspect, the movable member provides a function of elastically deforming the spring while operating as a portion of the motion converting mechanism, so that an efficient mechanism is provided without increasing the number of parts.

(Aspect 7)

The second rotary member also serves as the movable member.

(Aspect 8)

The pipe expanding tool further comprises:

a housing that defines the first axis; and a cap that is removably coupled to the housing and holds the jaws to be movable between the closed position and the open position and to be rotatable around the first axis, wherein the jaws and the cap form a jaw assembly.

The cap 55 and the jaw assembly 5 are examples of a "cap" and a "jaw assembly", respectively, in this aspect.

(Aspect 9)

The jaws are biased toward the closed position by an elastic member, and the wedge is configured to move in abutment with the jaws to thereby move the jaws from the closed position to the open position in at least a portion of the second movement phase.

(Aspect 10)

The pipe expanding tool further comprises:

a third rotary member that is operably coupled to the transmitting member and the first rotary member, wherein the first rotary member and the third rotary member are gear rings that mesh with each other.

The driving gear ring 67 is an example of a "third rotary member" in this aspect.

(Aspect 11)

The transmitting member comprises a one-way clutch.

According to this aspect, a simple and rational structure for rotating the first rotary member only in one direction is achieved by a common, general-purpose one-way clutch.

(Aspect 12)

The cam part includes:

a cam groove that is formed in a first one of the fixed member and the second rotary member and that extends obliquely or helically (spirally) around the second axis, and a follower that is engaged with the cam groove and operably coupled to a second one of the fixed member and the second rotary member.

The cam groove 631 and the ball 64 are examples of a "cam groove" and a "follower", respectively, in this aspect.

(Aspect 13)

The first part of the second rotary member is operably engaged with the fixed member via the cam part.

(Aspect 14)

The fixed member is a shaft extending along the second axis, and the second rotary member is at least partially arranged around the fixed member.

(Aspect 15)

The first axis and the second axis extend in parallel and are spaced apart from each other.

DESCRIPTION OF THE REFERENCE NUMERALS

1: pipe expanding tool, 10: housing, 11: body part, 111: bearing, 112: holding sleeve, 113: guide frame, 114: protruding part, 115: guide groove, 16: grip part, 161: lever, 163: switch, 164: plunger, 18: controller housing part, 181: battery mounting part, 185: battery, 20:

motor, 201: output shaft, 23: speed reducer, 27: controller, 3: wedge, 31: conical part, 32: cylindrical part, 33: flange part, 34: protruding part, 36: pin, 37: roller, 4: reciprocating mechanism, 41: driving shaft, 411: bearing, 412: bearing, 45: cam, 450: cam face, 451: minimum-diameter part, 452: diameter-varying part, 453: maximum-diameter part, 48: biasing spring, 5: jaw assembly, 51: jaw, 511: projection, 512: groove, 515: recess, 55: cap, 551: recess, 553: elastic member, 6: rotating mechanism, 600: motion converting mechanism, 60: rotary shaft, 61: first member, 611: cylindrical part, 612: ball holding hole, 615: flange part, 62: second member, 620: support plate, 621: cylindrical part, 622: ball guide groove, 625: shaft part, 63: fixed shaft, 630: support plate, 631: cam groove, 64: ball, 65: biasing spring, 66: one-way clutch, 67: driving gear ring, 671: cylindrical part, 675: gear teeth, 68: driven gear ring, 681: first ring, 682: cylindrical part, 683: gear teeth, 685: second ring, 686: cylindrical part, 687: flange, 688: projection, A1: driving axis, A2: axis, A3: axis

What is claimed is:

1. A pipe expanding tool that is configured to expand an end of a pipe, the pipe expanding tool comprising:
   a wedge that is movable in a reciprocating manner between a first position and a second position along a first axis;
   a plurality of jaws that are rotatable around the first axis and that are movable relative to the first axis to a closed position and to an open position defined radially outward of the closed position, the jaws being configured to move from the closed position to the open position as the wedge moves from the first position to the second position and to move from the open position to the closed position as the wedge moves from the second position to the first position;
   a spring; and
   a first rotary member that is engaged with the jaws such that the first rotary member is integrally rotatable with the jaws, the first rotary member being configured to be rotated only in one direction around the first axis by an elastic force of the spring, wherein the first rotary member is configured to be rotated by the elastic force of the spring, corresponding to at least a portion of a first movement phase of the wedge in which the wedge moves from the second position to the first position; and
   a second rotary member that is configured (i) to be rotated in a first direction around a second axis, corresponding to at least a portion of a second movement phase of the wedge, and (ii) to be rotated in a second direction opposite to the first direction around the second axis by the elastic force of the spring, corresponding to at least a portion of the first movement phase of the wedge; and
   a transmitting member that is operably coupled to the first rotary member and the second rotary member and that is configured to transmit only rotation of the second rotary member in the second direction to the first rotary member.

2. The pipe expanding tool as defined in claim 1, wherein:
   the spring is configured to store the elastic force, corresponding to at least a portion of the second movement phase of the wedge in which the wedge moves from the first position to the second position, and
   the first rotary member is configured to be rotated, by the elastic force stored in the spring, corresponding to at least a portion of the first movement phase of the wedge.

3. The pipe expanding tool as defined in claim 2, further comprising:
   a movable member that is operably coupled to the spring and configured to move to thereby elastically deform the spring, corresponding to at least a portion of the second movement phase of the wedge.

4. The pipe expanding tool as defined in claim 3, further comprising:
   a housing that defines the first axis; and
   a motor that is housed within the housing,
   wherein the wedge and the movable member are configured to be moved by power of the motor.

5. The pipe expanding tool as defined in claim 1, wherein:
   the second rotary member is operably coupled to the spring and is configured to elastically deform the spring by linearly moving along the second axis while rotating around the second axis, corresponding to at least a portion of the second movement phase of the wedge.

6. The pipe expanding tool as defined in claim 1, further comprising:
   a motion converting mechanism that is operably coupled to the spring and the first rotary member and that is configured to convert linear motion into rotation,
   wherein the motion converting mechanism is at least configured to be actuated by the elastic force of the spring to rotate the first rotary member, corresponding to at least a portion of the first movement phase of the wedge.

7. The pipe expanding tool as defined in claim 6, wherein:
   the motion converting mechanism includes:
      a fixed member; and
      the second rotary member that is operably engaged with the fixed member via a cam part, and
   at least a portion of the second rotary member is configured to cause the first rotary member to rotate by rotating around the second axis while moving along the second axis relative to the fixed member.

8. The pipe expanding tool as defined in claim 7, wherein the transmitting member is a one-way clutch.

9. The pipe expanding tool as defined in claim 7, wherein:
   the spring is a coil spring, and
   the fixed member and the second rotary member are at least partially disposed inside the coil spring.

10. The pipe expanding tool as defined in claim 9, wherein the second rotary member includes a first part and a second part that are connected to each other such that the first part and the second part are integrally rotatable around the second axis and are movable relative to each other along the second axis.

11. The pipe expanding tool as defined in claim 10, wherein:
   the first part is movable along the second axis relative to the fixed member and the second part, and
   the first part is configured to elastically deform the spring by moving along the second axis, corresponding to at least a portion of the second movement phase of the wedge.

12. The pipe expanding tool as defined in claim 11, further comprising:
   a housing that defines the first axis; and
   a motor that is housed within the housing,
   wherein the first part is configured to be moved by power of the motor, corresponding to at least the portion of the second movement phase of the wedge.

13. The pipe expanding tool as defined in claim 12, further comprising:

a cam that is operably coupled to the motor and configured to be rotationally driven by the motor to move the wedge along the first axis.

14. The pipe expanding tool as defined in claim 13, further comprising:

an abutting member that is configured to be moved by the cam in abutment with the cam and abut on the second rotary member to move the second rotary member, corresponding to at least a portion of the second movement phase of the wedge.

* * * * *